United States Patent
Terry (10) Patent No.: US 9,628,325 B2
(45) Date of Patent: *Apr. 18, 2017

(54) METHOD AND SYSTEM FOR RECOGNIZING RADIO LINK FAILURES ASSOCIATED WITH HSUPA AND HSDPA CHANNELS

(71) Applicant: Intel Corporation, Santa Clara, CA (US)

(72) Inventor: Stephen E. Terry, Northport, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,955

(22) Filed: Dec. 16, 2015

(65) Prior Publication Data
US 2016/0119178 A1  Apr. 28, 2016

Related U.S. Application Data

(63) Continuation of application No. 13/663,246, filed on Oct. 29, 2012, now Pat. No. 9,253,654, which is a
(Continued)

(51) Int. Cl.
*H04W 24/02* (2009.01)
*H04L 12/24* (2006.01)
(Continued)

(52) U.S. Cl.
CPC ........ *H04L 41/0654* (2013.01); *H04L 1/1812* (2013.01); *H04L 1/203* (2013.01);
(Continued)

(58) Field of Classification Search
CPC ... H04L 41/0654; H04L 1/1812; H04L 1/203; H04L 1/1867; H04W 24/08;
(Continued)

(56) References Cited

U.S. PATENT DOCUMENTS 5,230,082 A  7/1993  Ghisler et al.
5,258,980 A  11/1993  Maebara et al.
(Continued)

FOREIGN PATENT DOCUMENTS

CN  1326626  12/2001
EP  1401140 A2  3/2004
(Continued)

OTHER PUBLICATIONS

Notification to Grant for Chinese Patent Application No. 200680004085.4 mailed Dec. 5, 2012, 6 pages.
(Continued)

*Primary Examiner* — Phuc Tran
(74) *Attorney, Agent, or Firm* — Schwabe, Williamson & Wyatt, P.C.

(57) ABSTRACT

A method and system for detecting radio link (RL) failures between a wireless transmit/receive unit (WTRU) and a Node-B are disclosed. When signaling radio bearers (SRBs) are supported by high speed uplink packet access (HSUPA), an RL failure is recognized based on detection of improper operation of at least one of an absolute grant channel (AGCH), a relative grant channel (RGCH), a hybrid-automatic repeat request (H-ARQ) information channel (HICH), an enhanced uplink dedicated physical control channel (E-DPCCH) and an enhanced uplink dedicated physical data channel (E-DPDCH). When SRBs are supported by high speed downlink packet access (HSDPA), an RL failure is recognized based on detection of improper operation of at least one of a high speed shared control channel (HS-SCCH), a high speed physical downlink shared channel (HS-PDSCH) and a high speed dedicated physical control channel (HS-DPCCH).

24 Claims, 3 Drawing Sheets

Related U.S. Application Data continuation of application No. 12/723,211, filed on Mar. 12, 2010, now Pat. No. 8,325,596, which is a continuation of application No. 11/322,704, filed on Dec. 30, 2005, now Pat. No. 7,701,844.

(60) Provisional application No. 60/651,594, filed on Feb. 9, 2005.

(51) Int. Cl.

| | | |
|---|---|---|
| *H04L 1/20* | (2006.01) | |
| *H04W 24/08* | (2009.01) | |
| *H04L 1/18* | (2006.01) | |
| *H04W 72/12* | (2009.01) | |
| *H04W 76/04* | (2009.01) | |

(52) U.S. Cl.
CPC ........... *H04W 24/02* (2013.01); *H04W 24/08* (2013.01); *H04L 1/1867* (2013.01); *H04W 72/1231* (2013.01); *H04W 72/1278* (2013.01); *H04W 76/04* (2013.01)

(58) Field of Classification Search
CPC . H04W 24/02; H04W 72/1231; H04W 76/04; H04W 72/1278
See application file for complete search history.

(56) References Cited

U.S. PATENT DOCUMENTS

| | | | |
|---|---|---|---|
| 5,754,958 A | 5/1998 | Tsuji et al. | |
| 6,540,694 B1 | 4/2003 | Van Bladel et al. | |
| 6,788,937 B1 | 9/2004 | Willenegger et al. | |
| 7,155,261 B2 | 12/2006 | Chen | |
| 7,305,011 B2 | 12/2007 | Shae et al. | |
| 7,352,722 B2 | 4/2008 | Malladi et al. | |
| 7,701,844 B2 * | 4/2010 | Terry .................... | H04W 24/08 370/216 |
| 8,325,596 B2 * | 12/2012 | Terry .................... | H04W 24/08 370/216 |
| 9,253,654 B2 * | 2/2016 | Terry .................... | H04W 24/08 |
| 2002/0160744 A1 | 10/2002 | Choi et al. | |
| 2003/0022628 A1 | 1/2003 | Mamiya et al. | |
| 2003/0185159 A1 | 10/2003 | Seo et al. | |
| 2003/0189920 A1 | 10/2003 | Erami et al. | |
| 2003/0210668 A1 | 11/2003 | Malladi et al. | |
| 2003/0220119 A1 | 11/2003 | Terry | |
| 2004/0009767 A1 | 1/2004 | Lee et al. | |
| 2004/0114574 A1 | 6/2004 | Zeira et al. | |
| 2004/0116126 A1 | 6/2004 | Cave et al. | |
| 2004/0156345 A1 | 8/2004 | Steer et al. | |
| 2004/0157618 A1 | 8/2004 | Brouwer | |
| 2004/0180677 A1 | 9/2004 | Harris et al. | |
| 2004/0190486 A1 | 9/2004 | Oshiba | |
| 2004/0192208 A1 | 9/2004 | Kong et al. | |
| 2004/0196802 A1 | 10/2004 | Bae et al. | |
| 2004/0198294 A1 | 10/2004 | Hagin-Metzer | |
| 2004/0203441 A1 | 10/2004 | Smith | |
| 2004/0253955 A1 | 12/2004 | Love et al. | |
| 2004/0259533 A1 | 12/2004 | Nixon et al. | |
| 2005/0169171 A1 | 8/2005 | Cheng et al. | |
| 2005/0277419 A1 | 12/2005 | Takano et al. | |
| 2006/0233124 A1 | 10/2006 | Palanki | |

FOREIGN PATENT DOCUMENTS

| | | |
|---|---|---|
| EP | 1408658 A2 | 4/2004 |
| EP | 1467528 A1 | 10/2004 |
| EP | 1903821 A2 | 3/2008 |
| JP | 07-231289 A | 9/2007 |
| WO | 93/16562 A1 | 8/1993 |
| WO | 00/21314 A2 | 4/2000 |
| WO | 0030289 | 5/2000 |
| WO | 0159945 | 8/2001 |
| WO | 03/075503 A1 | 9/2003 |
| WO | 2004095763 | 11/2004 |
| WO | 2005/009069 A1 | 1/2005 |
| WO | 2010/016996 A1 | 2/2010 |
| WO | 2010/039081 A1 | 4/2010 |

OTHER PUBLICATIONS

Office Action for Korean Patent Application No. 10-2007-7020121 mailed Mar. 31, 2011, 7 pages.
Office Action for Korean Patent Application No. 1 0-2011-7012443 mailed Jul. 13, 2011, 6 pages.
Office Action for Korean Patent Application No. 10-2011-7024017 mailed Nov. 24, 2011, 9 pages.
Notice of Allowance for Korean Patent Application No. 10-2011-7024017 mailed Oct. 24, 2012, 3 pages.
Office Action for Korean Patent Application No. 10-2012-7002723 mailed Mar. 26, 2012, 9 pages.
Notice of Allowance for Korean Patent Application No. 1 0-2012-7002723 mailed Mar. 26, 2013, 3 pages.
Office Action for Korean Patent Application No. 1 0-2012-7013907 mailed Aug. 15, 2012, 9 pages.
Office Action of Malaysian Patent Application No. PI20060479 mailed Nov. 30, 2011, 3 pages.
Notice of Allowance for Taiwan Patent Application No. 097125793 mailed Sep. 10, 2012, 3 pages.
Office Action for Taiwan Patent Application No. 098103427 mailed Oct. 17, 2012, 9 pages.
Notice of Allowance for Korean Patent Application No. 2013-701 0292 mailed Jul. 12, 2013, 3 pages.
Office Action and Search Report for Chinese Patent Application No. 201210558878.8 mailed Sep. 29, 2014, 10 pages.
Examiner's Report for Canadian Patent Application No. 2,856,916 mailed Oct. 24, 2014, 3 pages.
TSG-RAN Working Group 1 meeting #17, TSGR1 (00) 1353, Dedicated Channel Synchronization, Nov. 2000, 3 pages.
Office Action of Malaysian Patent Application No. PI20060479 mailed Aug. 15, 2013, 4 pages.
Search Report and Written Opinion mailed Jun. 9, 2015 from Singapore Divisional Application No. 201303722-1.
Office Action issued Sep. 14, 2015 from Canadian Patent Application No. 2,856,916.
Office Action issued Nov. 7, 2015 from Norwegian Patent Application No. 20074409.
Ericsson, "HARQ Retransmission and Failure Indication for Improved Outer Loop Power Control," 3GPP TSG RAN WG3 Meeting #45, R3-041503 (Nov. 15-19, 2004).
Holma et al., "WCDMA for UMTS: Radio Access for Third Generation Mobile Communcaitons," John Wiley & Sons, Ltd, 3rd edition (2004).
Third Generation Partnership Project, "Technical Specification Group Radio Access Network; Radio Resource Control (RRC); Protocol Specification (Release 4)," 3GPP TS 25.331 V4.17.0 (Mar. 2005).
Third Generation Partnership Project, "Technical Specification Group Radio Access Network; Radio Resource Control (RRC); Protocol Specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 5)," 3GPP TS 25.331 V5.15.0 (Dec. 2005).
Third Generation Partnership Project, "Technical Specification Group Radio Access Network; Physical channels and mapping of transport channels onto physical channels (FDD) (Release 5)," 3GPP TS 25.211 V5.6.0 (Sep. 2004).
Third Generation Partnership Project, "Technical Specification Group Radio Access Network; Physical channels and mapping of transport channels onto physical channels (FDD) (Release 5)," 3GPP TS 25.211 V5.8.0 (Dec. 2004).

(56) References Cited

OTHER PUBLICATIONS

Third Generation Partnership Project, "Technical Specification Group Radio Access Network; FDD Enhanced Uplink, Overall description; Stage 2 (Release 6)," 3GPP TS 25.309 V6.5.0 (Dec. 2005).
Third Generation Partnership Project, "Technical Specification Group Radio Access Network; FDD Enhanced Uplink; Overall description; Stage 2 (Release 6)," 3GPP TS 25.309 V6.1.0 (Dec. 2004).
Third Generation Partnership Project, "Technical Specification Group Radio Access Network; Physical channels and mapping of transport channels onto physical channels (FDD) (Release 6)," 3GPP TS 25.211 V6.7.0 (Dec. 2005).
Third Generation Partnership Project, "Technical Specification Group Radio Access Network; Physical channels and mapping of transport channels onto physical channels (FDD) (Release 6)," 3GPP TS 25.211 V6.2.0 (Sep. 2004).
Third Generation Partnership Project, "Technical Specification Group Radio Access Network; Radio Resource Control (RRC); Protocol Specification (Release 4)," 3GPP TS 25.331 V4.16.0 (Dec. 2004).
Third Generation Partnership Project, "Technical Specification Group Radio Access Network; Radio Resource Control (RRC); Protocol Specification (Release 5)," 3GPP TS 25.331 V5.11.0 (Dec. 2004).
Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).
Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).
Third Generation Partnership Project, "Technical Specification Group Radio Access Network; Physical layer procedures (FDD) (Release 6)," 3GPP TS 25.214 V6.7.1 (Dec. 2005).
Third Generation Partnership Project, "Technical Specification Group Radio Access Network; Physical layer procedures (FDD) (Release 6)," 3GPP TS 25.214 V6.4.0 (Dec. 2004).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Physical layer procedures (FDD) (Release 5)," 3GPP TS 25.214 V5.10.0 (Dec. 2004).
Third Generation Partnership Project, Technical Specification Group Services and System Aspects; Quality of Service (QoS) concept and architecture (Release 6); 3GPP TS 23.107 V6.3.0 (Jun. 2005).
Third Generation Partnership Project, Technical Specification Group Services and System Aspects; Quality of Service (QoS) concept and architecture (Release 1999); 3GPP TS 23.107 V3.9.0 (Sep. 2002).
Third Generation Partnership Project, Technical Specification Group Services and System Aspects; Quality of Service (QoS) concept and architecture (Release 4); 3GPP TS 23.107 V4.6.0 (Dec. 2002).
Third Generation Partnership Project, "Technical Specification Group Radio Access Networks; User Equipment (UE) radio transmission and reception (FDD) (Release 1999)," 3GPP TS 25.101 V3.17.0 (Mar. 2004).
Third Generation Partnership Project, "Technical Specification Group Radio Access Networks; User Equipment (UE) radio transmission and reception (FDD) (Release 4)," 3GPP TS 25.101 V4.12.0 (Sep. 2005).
Third Generation Partnership Project, Technical Specification Group Services and System Aspects; Quality of Service (QoS) concept and architecture (Release 6); 3GPP TS 23.107 V6.2.0 (Dec. 2004).
Third Generation Partnership Project, Technical Specification Group Services and System Aspects; Quality of Service (QoS) concept and architecture (Release 5); 3GPP TS 23.107 V5.13.0 (Dec. 2004).
Third Generation Partnership Project, "Technical Specification Group Radio Access Networks; User Equipment (UE) radio transmission and reception (FDD) (Release 6)," 3GPP TS 25.101 V6.10.0 (Dec. 2005).
Third Generation Partnership Project, "Technical Specification Group Radio Access Networks; User Equipment (UE) radio transmission and reception (FDD) (Release 6)," 3GPP TS 25.101 V6.6.0 (Dec. 2004).
Third Generation Partnership Project, "Technical Specification Group Radio Access Networks; User Equipment (UE) radio transmission and reception (FDD) (Release 7)," 3GPP TS 25.101 V7.2.0 (Dec. 2005).
Third Generation Partnership Project, "Technical Specification Group Radio Access Networks; User Equipment (UE) radio transmission and reception (FDD) (Release 4)," 3GPP TS 25.101 V4.11.0 (Mar. 2004).
Third Generation Partnership Project, "Technical Specification Group Radio Access Networks; User Equipment (UE) radio transmission and reception (FDD) (Release 5)," 3GPP TS 25.101 V5.13.0 (Dec. 2004).
Third Generation Partnership Project, "Technical Specification Group Radio Access Networks; User Equipment (UE) radio transmission and reception (FDD) (Release 1999)," 3GPP TS 25.101 V3.18.0 (Sep. 2005).
Third Generation Partnership Project, "Technical Specification Group Radio Access Networks; User Equipment (UE) radio transmission and reception (FDD) (Release 5)," 3GPP TS 25.101 V5.17.0 (Dec. 2005).
Extended European Search Report for European Patent Application No. 06734470.5 mailed Sep. 19, 2012, 7 pages.
First Examination Report for European Patent Application No. 06734470.5 mailed May 28, 2013, 5 pages.
Further Examination Report for European Patent Application No. 06734470.5 mailed Jun. 20, 2014, 4 pages.
Non-Final Office Action for U.S. Appl. No. 11/322,704 mailed Sep. 18, 2008, 6 pages.
Non-Final Office Action for U.S. Appl. No. 11/322,704 mailed Mar. 4, 2009, 5 pages.
Non-Final Office Action for U.S. Appl. No. 11/322,704 mailed Nov. 9, 2009, 5 pages.
Notice of Allowance for U.S. Appl. No. 11/322,704 mailed Dec. 11, 2009, 6 pages.
Non-Final Office Action for U.S. Appl. No. 12/723,211 mailed Sep. 7, 2010, 5 pages.
Non-Final Office Action for U.S. Appl. No. 12/723,211 mailed Jan. 26, 2012, 4 pages.
Notice of Allowance for U.S. Appl. No. 12/723,211 mailed Jan. 24, 2011, 4 pages.
Notice of Allowance for U.S. Appl. No. 12/723,211 mailed Jul. 27, 2012, 7 pages.
International Preliminary Report on Patentability for PCT/US2006/004215 mailed Jul. 7, 2008, 13 pages.
Office Action for Canadian Patent Application No. 2,597,303 mailed Jan. 25, 2011, 4 pages.
Office Action for Canadian Patent Application No. 2,597,303 mailed Oct. 4, 2011, 2 pages.
Office Action for Canadian Patent Application No. 2,597,303 mailed Jul. 3, 2012, 3 pages.
Office Action for Chinese Patent Application No. 200680004085.4 mailed Aug. 25, 2011, 17 pages.
Office Action for Chinese Patent Application No. 200680004085.4 mailed Jun. 26, 2012, 8 pages.
Office Action and Search Report issued Mar. 17, 2016 from Norwegian Patent Application No. 20074409, 13 pages.
3GPP, "Universal Mobile Telecommunications System (UMTS); Radio Resource Control (RRC) protocol specification (3GPP TS 25.331 version 6.4.0 Release 6)," ETSI TS 125 331 V6.4.0 (Dec. 2004), 1,122 pages.

(56) References Cited

OTHER PUBLICATIONS

Extended European Search Report issued Dec. 23, 2016 from European Divisional Application No. 16190925.4, 12 pages.
Office Action issued Feb. 13, 2017 from Norwegian Patent Application No. 20074409, 7 pages.
3GPP, "Technical Specification Group Radio Access Network; Physical layer—Measurements (FDD) (Release 6)," 3GPP TS 25.215 V6.1.0 (Dec. 2004), Jan. 5, 2005, 18 pages.

* cited by examiner

METHOD AND SYSTEM FOR RECOGNIZING RADIO LINK FAILURES ASSOCIATED WITH HSUPA AND HSDPA CHANNELS

CROSS REFERENCE TO RELATED APPLICATIONS

This application is continuation of U.S. patent application Ser. No. 13/663,246 (now U.S. Pat. No. 9,253,654) filed Oct. 29, 2012, entitled "METHOD AND SYSTEM FOR RECOGNIZING RADIO LINK FAILURES ASSOCIATED WITH HSUPA AND HSDPA CHANNELS," which is a continuation of U.S. patent application Ser. No. 12/723,211 filed Mar. 12, 2010, entitled "METHOD AND SYSTEM FOR RECOGNIZING RADIO LINK FAILURES ASSOCIATED WITH HSUPA AND HSDPA CHANNELS" and issued as U.S. Pat. No. 8,325,596 on Dec. 4, 2012, which is a continuation of U.S. patent application Ser. No. 11/322,704 filed Dec. 30, 2005, entitled "METHOD AND APPARATUS FOR RECOGNIZING RADIO LINK FAILURES ASSOCIATED WITH HSUPA AND HSDPA CHANNELS," and issued as U.S. Pat. No. 7,701,844 on Apr. 20, 2010, which claims the benefit of U.S. Patent Application No. 60/651,594 filed Feb. 9, 2005. All of the aforementioned disclosures are incorporated by reference herein.

FIELD OF INVENTION

The present invention is related to a wireless communication system including a wireless transmit/receive unit (WTRU) and a Node-B. More particularly, the present invention is related to a method and system for recognizing radio link (RL) failures associated with high speed uplink packet access (HSUPA) and high speed downlink packet access (HSDPA) channels established between the WTRU and the Node-B.

BACKGROUND

In a third generation partnership project (3GPP) wireless communication system, signaling radio bearers (SRBs) are used to maintain a connection, (i.e., an RL), between a WTRU and a Universal Terrestrial Radio Access Network (UTRAN). When reception of the physical channel connecting the WTRU and Node-B is below a quality threshold or can not be detected, (i.e., the physical channel that allows for signaling information to be exchanged between the WTRU and UTRAN has failed), an RL failure is declared, and the WTRU and the UTRAN initiate procedures to reestablish the connection between the WTRU and the UTRAN.

In order to realize the loss of the SRBs and take a proper action, the WTRU and the UTRAN constantly monitor for an occurrence of an RL failure. A primary objective of the RL failure detection procedure is to detect failure of the transport channels (TrCHs) and physical channels to which the SRBs are mapped.

In the 3GPP wireless communication system, SRBs are mapped to dedicated transport channels (DCHs) which are in turn mapped to dedicated physical channels (DPCHs). A DPCH comprises a dedicated physical control channel (DPCCH) and a dedicated physical data channel (DPDCH).

The criteria to detect the status of the DPCHs and DCHs includes estimation of the DPCCH quality, (and comparison to a predetermined threshold), and/or collection of statistics of correct reception of data packets on a DPCH based on cyclic redundancy check (CRC). When the criteria are met, the WTRU and the UTRAN invoke a procedure to release and reestablish the connection between the WTRU and the UTRAN.

In the 3GPP wireless communication system, both continuous services, (e.g., speech), and interactive services, (e.g., web browsing), are supported. Dedicated channels are efficient for supporting continuous services, while shared channels are efficient for supporting interactive services. The shared channels provide more efficient use of radio resources and improved quality of service (QoS) for interactive services. However, when the service is mapped to shared channels, the use of dedicated channels for SRBs is inefficient since the traffic requirement is not continuous.

In 3GPP wireless communication systems, HSUPA and HSDPA primarily utilize high speed shared channels for services that do not require continuous channel allocations. These channels utilize fast physical and medium access control (MAC) layer signaling between the WTRU and the Node-B for channel assignment and hybrid-automatic repeat request (H-ARQ) for efficient and fast recovery of failed transmissions.

If the SRBs are supported by either HSUPA or HSDPA channels rather than dedicated channels, it is possible that SRBs may fail, even though dedicated channels are still operating. Furthermore, the criteria to detect the dedicated channel failure may not be met even though the HSUPA or HSDPA channels supporting the SRBs are not operating. In this case, RL failure will not be detected even though the SRBs have already lost connectivity.

SUMMARY

The present invention is related to a method and system for detecting RL failures between a WTRU and a Node-B when SRBs are supported by HSUPA or HSDPA. When SRBs are supported by the HSUPA, the WTRU monitors at least one of an absolute grant channel (AGCH), a relative grant channel (RGCH) and an H-ARQ information channel (HICH) and recognizes an RL failure based on detection of improper operation of at least one of the AGCH, the RGCH and the HICH. The Node-B monitors at least one of an enhanced uplink dedicated physical control channel (E-DPCCH) and an enhanced uplink dedicated physical data channel (E-DPDCH) and recognizes the RL failure based on detection of improper operation of at least one of the E-DPDCH and the E-DPCCH.

When SRBs are supported by the HSDPA, the WTRU monitors at least one of a high speed shared control channel (HS-SCCH) and a high speed physical downlink shared channel (HS-PDSCH) and recognizes an RL failure based on detection of improper operation of at least one of the HS-SCCH and the HS-PDSCH. The Node-B monitors a high speed dedicated physical control channel (HS-DPCCH) and recognizes an RL failure based on detection of improper operation of the HS-DPCCH.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
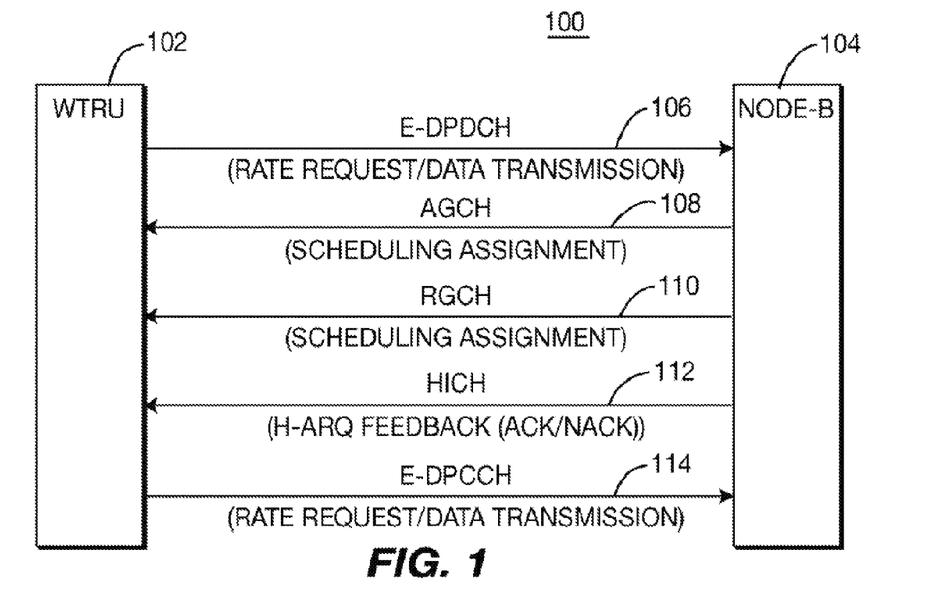
FIG. 1 is a wireless communication system including a WTRU and a Node-B which communicate via HSUPA channels established in accordance with the present invention.

FIG. 1 is a diagram of a wireless communication system 100 including a WTRU 102 and a Node-B 104 which communicate via HSUPA channels established between the WTRU 102 and the Node-B 104 in accordance with the present invention. Between the WTRU 102 and the Node-B 104, an E-DPDCH 106, an AGCH 108, an RGCH 110 (optional), an HICH 112 and an E-DPCCH 114 are established.

Figure 2:
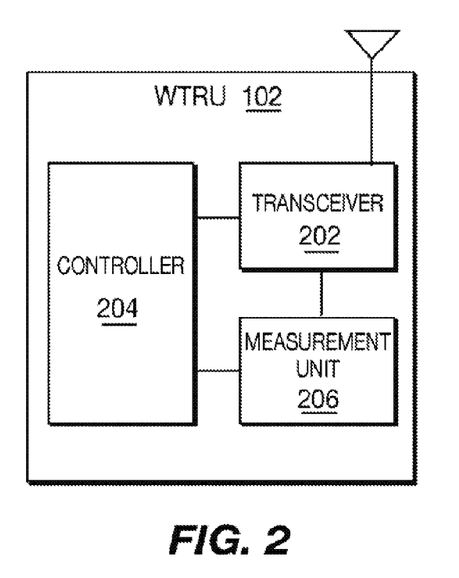
FIG. 2 is a block diagram of an exemplary WTRU used in the system of FIG. 1.

FIG. 2 is a block diagram of an exemplary WTRU 102 used in the system 100 of FIG. 1. The WTRU 102 includes a transceiver 202, a controller 204 and a measurement unit 206.

Figure 3:
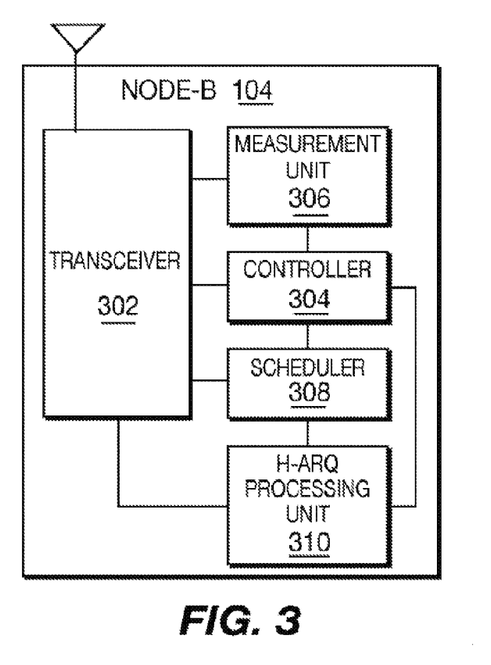
FIG. 3 is a block diagram of an exemplary Node-B used in the system of FIG. 1.

FIG. 3 is a block diagram of an exemplary Node-B 104 used in the system 100 of FIG. 1. The Node-B 104 includes a transceiver 302, a controller 304, a measurement unit 306, a scheduler 308 and an H-ARQ processing unit 310.

In accordance with one embodiment of the present invention, the transceiver 202 of the WTRU 102 sends a rate request with scheduling information to the Node-B 104 via the E-DPCCH 114 and the E-DPDCH 106. The transceiver 302 of the Node-B 104 receives the rate request and the scheduler 308 analyses the rate request and generates and sends scheduling an assignment to the WTRU 102 via the AGCH 108, (or optionally via the RGCH 110), to control the uplink access and maximum rate that the WTRU 102 is allowed to transmit. The transceiver 202 of the WTRU 102 sends uplink (UL) data to the Node-B 104 via the E-DPCCH 114 and the E-DPDCH 106. When the transceiver 302 of the Node-B 104 receives the UL data, the H-ARQ processing unit 310 of the Node-B 104 generates H-ARQ feedback to the WTRU 102 via the HICH 112. The controller 204 of the WTRU 102 and the controller 304 of the Node-B 104 detect the RL failure in accordance with the present invention, which will be explained in detail hereinafter.

Referring to FIG. 1, certain radio bearers (RBs) may be assigned a guaranteed bit rate that does not require a rate request and Node-B scheduling. When configured for a guaranteed bit rate, the rate request on the E-DPCCH 114 and/or the E-DPDCH 106, and the scheduling grant transmitted on the AGCH 108 and/or the RGCH 110, is not required for transmission of UL data.

Still referring to FIG. 1, when allowed to transmit in the uplink, either by reception of a scheduling grant or by a configured guaranteed bit rate, the WTRU 102 utilizes H-ARQ procedures for transmission. There may be several H-ARQ processes operating independently between the WTRU 102 and the Node-B 104. In the WTRU 102, each H-ARQ process transmits a block of data via the E-DPDCH 106 and waits for H-ARQ feedback on the HICH 112, (i.e., a positive acknowledgement (ACK) or a negative acknowledgement (NACK)), from the Node-B 104.

In the Node-B 104, if the CRC check on the received data block is successful, an ACK is transmitted. Otherwise, a NACK may optionally be transmitted via the HICH 112 for each H-ARQ transmission. If a NACK is received by the WTRU 102, a previous data block is retransmitted as long as the maximum number of retransmissions is not exceeded. If an ACK is received or the maximum number of retransmission is exceeded, the WTRU H-ARQ process may be assigned a new transmission. The rate requests and scheduling assignments may coincide with uplink data transmissions, and several independent H-ARQ transmissions and ACK/NACK feedback may overlap.

Figure 4:
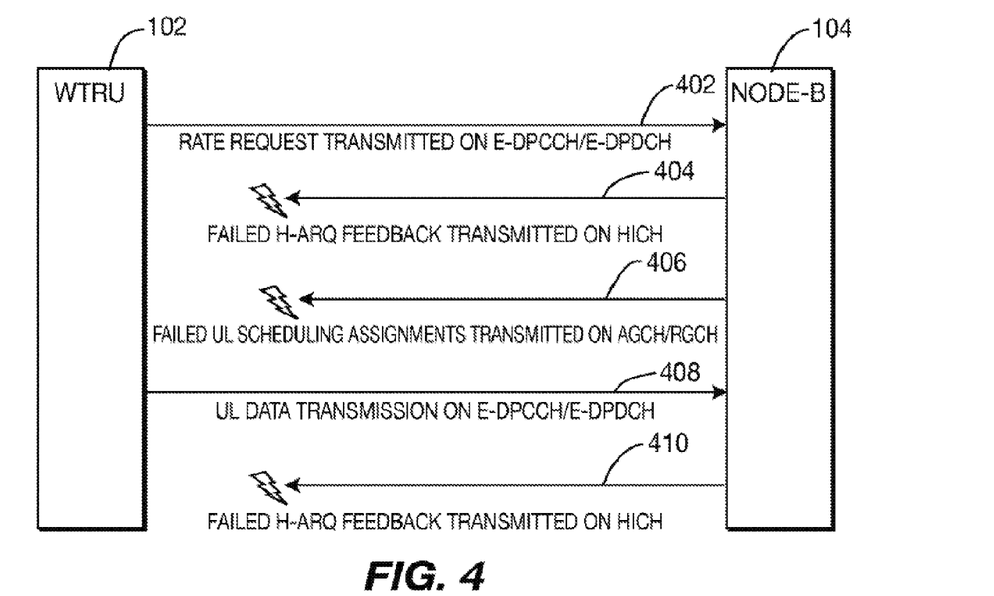
FIG. 4 is a scheme for recognizing an RL failure at the WTRU utilizing the HSUPA channels of the system of FIG. 1.

In accordance with the present invention, the WTRU 102 and the Node-B 104 utilizes new criteria for recognizing an RL failure. FIG. 4 illustrates a scheme for recognizing an RL failure at the WTRU 102 utilizing the HSUPA channels of the wireless communication system 100, as shown in FIG. 1. The WTRU 102 utilizes criteria based on reception on the AGCH 108, the RGCH 110 and the HICH 112 according to specified procedures known to the WTRU 102. The transceiver 202 of the WTRU 102 sends a rate request 402 to the Node-B 104 for uplink transmission in accordance with a rate request and scheduling procedure. In response, the scheduler 308 of the Node-B 104 sends scheduling assignments 406, (which is shown as a failed transmission in FIG. 4), back to the WTRU 102 via an AGCH or a RGCH. The scheduling assignments 406 may or may not be successfully received. If the WTRU 102 does not receive any scheduling assignments 406 or HARQ feedback 404 after sending the rate request 402, (preferably multiple times or over a specified period), the WTRU 102 recognizes that the rate request and scheduling procedure has failed and declares a radio link failure which invokes a procedure for recovering the connection.

The measurement unit 206 of the WTRU 102 shown in FIG. 2 may also measure channel quality on the AGCH 108 and the RGCH 110. If the channel quality on the AGCH 108 or the RGCH 110 falls below a predetermined threshold for a predetermined period of time, the WTRU 102 recognizes that the rate request and scheduling procedure has failed and declares an RL failure which invokes a procedure for recovering the RL. The quality of the AGCH 108 and the RGCH 110 may be evaluated based on signal-to-interference ratio (SIR), received energy per chip ($E_b$)/power density in the band ($N_o$), block error rate (BLER) or any other relevant criteria.

If the WTRU 102 successfully receives a scheduling assignment 406, the WTRU 102 initiates a UL data transmission 408 in accordance with the UL scheduling assignment 406. In response to the UL data transmission 408, the Node-B 104 sends H-ARQ feedback 410 on the HICH 112, (which is shown as a failed transmission in FIG. 4), to the WTRU 102. If the WTRU 102 fails to receive an ACK on the HICH 112, (preferably multiple times or over a specified period), the WTRU 102 recognizes that the UL data transmission and H-ARQ procedure has failed and declares an RL failure which invokes a procedure for recovering the RL. If the ACK/NACK ratio of the UL data transmission falls below a predetermined threshold, the WTRU 102 may also recognize that the RL has failed.

The measurement unit 206 of the WTRU 102, as shown in FIG. 2, also monitors channel quality on the HICH 112. If the channel quality on the HICH 112 falls below a predetermined threshold for a predetermined period of time, the WTRU 102 recognizes that the UL data transmission and H-ARQ procedure has failed and declares an RL failure which invokes a procedure for recovering the RL. The quality of the HICH 112 may be evaluated based on SIR, $E_b/N_o$, BLER or any other relevant criteria.

If either of the AGCH 108 or the RGCH 110 reduces the SRB or other RBs utilizing HSUPA to a data rate below an acceptable threshold, the WTRU recognizes that the RL has failed.

If the SRBs supported by HSUPA channels are not assigned a guaranteed bit rate, and therefore the WTRU 102 is required to send a rate request, and scheduling assignments are sent back in response to the rate request, the reception on the AGCH 108 and the RGCH 110 is used to determine RL failure. Otherwise, if the SRBs supported by HSUPA channels are assigned a guaranteed bit rate, the reception criteria of the AGCH 108 and the RGCH 110 for RL failure may not be applied.

Multiple RGCHs 110 and HICHs 112 may be configured for the WTRU 102 and, in each cell, the RGCH 110 and the HICH 112 may utilize a common physical channel. RL failure based on HICH transmissions can be declared only if the reception is not achieved on any of the HICH channels. An exception may apply if an HICH transmission has failed on the primary serving Node-B. RL failure based on the RGCH transmissions may be declared if any one RGCH 110 reduces the rate below the predetermined threshold.

Criteria for RL failure detection in the WTRU 102 is specified for UTRAN configuration changes that result in disabling HSUPA transmission in the WTRU 102. When SRBs are utilizing HSUPA, UTRAN controlled configuration changes which result in disabling HSUPA operation in the WTRU 102 are used as an additional RL failure detection criteria.

Figure 5:
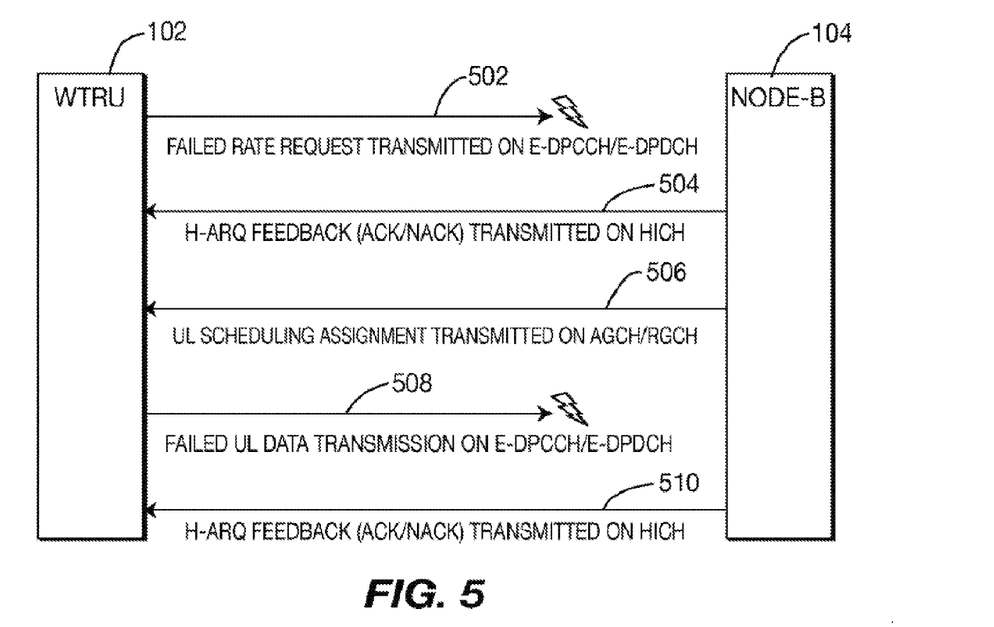
FIG. 5 is a scheme for recognizing an RL failure at the Node-B utilizing the HSUPA channels of the system of FIG. 1.

FIG. 5 illustrates a scheme for detecting RL failure at the Node-B 104 utilizing the HSUPA channels of the wireless communication system 100, as shown in FIG. 1. The Node-B 104 utilizes criteria based on reception on the E-DPDCH 106 and the E-DPCCH 114. The transceiver 202 of the WTRU 102 sends a rate request 502, (which is shown as a failed transmission in FIG. 5), to the Node-B 104 for enhanced uplink transmission. The WTRU 102 sends rate requests 502 upon arrival of new HSUPA data to transmit and may also be configured to send a rate request 502 periodically. The periodicity configured for WTRU rate request reporting in advance of and/or following an initial rate request resulting in the transmission of scheduling information may be known to the Node-B 104. WTRU rate requests 502 may also be generated in response to a request from the Node-B 104. In response to a rate request 502, the Node-B sends H-ARQ feedback 504 to the WTRU 102 over the HICH 112, and also sends a UL scheduling assignment 506 to the WTRU 102 over the AGCH 108 or the RGCH 110. Based on specified rate request procedures, the Node-B 104 may use the knowledge of lost rate requests 502, (including a periodic request or a polled request), as criteria for RL failure detection.

The measurement unit 306 of the Node-B 104, as shown in FIG. 3, also measures channel quality of the E-DPCCH 114 from the WTRU 102. If the channel quality of the E-DPCCH 114 remains below a predetermined threshold for a predetermined period of time, the Node-B 104 may also declare RL failure. The Node-B 104 may also use knowledge of when the E-DPCCH 114 is known to be active based on knowledge of scheduled and non-scheduled grants signaled to the WTRU 102. The quality of the E-DPCCH 114 may be evaluated based on SIR, $E_b/N_o$, BLER or any other relevant criteria.

As shown in FIG. 5, in response to receiving the UL scheduling assignment 506, the WTRU 102 sends a UL data transmission 508, (which is shown as a failed transmission in FIG. 5) to the Node-B 104. If the Node-B 104 receives no response following the transmission of the UL scheduling assignment 506, (preferably after several consecutive failures or a statistical failure threshold is reached), the Node-B 104 may declare RL failure. If the Node-B 104 has knowledge of synchronous H-ARQ retransmissions followed by H-ARQ feedback 504 including a NACK, or if the Node-B 104 receives an old data packet followed by H-ARQ feedback 504 including an ACK, (preferably after several consecutive failures or a statistical failure threshold is reached), the Node-B 104 may declare RL failure. The Node-B 104 may also use an ACK/NACK ratio on final data retransmissions from the WTRU 102 as criteria for RL failure.

Additionally or alternatively, the RL failure may be determined by a radio network controller (RNC). In this case the Node-B 104 provides necessary information to the RNC, such as E-DPCCH quality, rate request reception statistics, H-ARQ data transmission statistics, (i.e., ACK/NACK information), and/or E-DPDCH and E-DPCCH BLER.

If improper operation of at least one of the E-DPCCH 114 and the E-DPDCH occurs, a failure of data transmission 508 from the WTRU 102 is detected, and the Node-B 104 recognizes that the RL has failed and invokes a procedure for releasing the RL. If the Node-B 104 successfully receives the UL data transmission 508, the Node-B 104 sends H-ARQ feedback 510 to the WTRU 102 on the HICH 112

Figure 6:
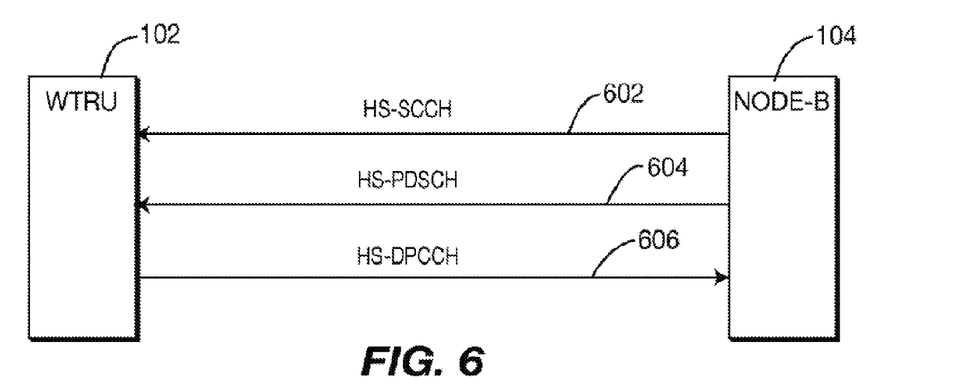
FIG. 6 shows HSDPA channels established between the WTRU and the Node-B of the system of FIG. 1.

FIG. 6 shows HSDPA channels established between the WTRU 102 and the Node-B 104. In HSDPA, scheduling assignments for downlink (DL) transmissions is transmitted on a high speed shared control channel (HS-SCCH) 602 from the Node-B 104 to the WTRU 102. Using scheduling information received on the HS-SCCH 602, the WTRU 102 receives the data transmission on a high speed physical downlink shared channel (HS-PDSCH) 604. The WTRU 102 then transmits H-ARQ feedback, (i.e., ACK or NACK), and a channel quality indication (CQI) to the Node-B 104 via a high speed dedicated physical control channel (HS-DPCCH) 606. This transmission procedure applies to each operational HARQ process in the WTRU 102.

Figure 7:
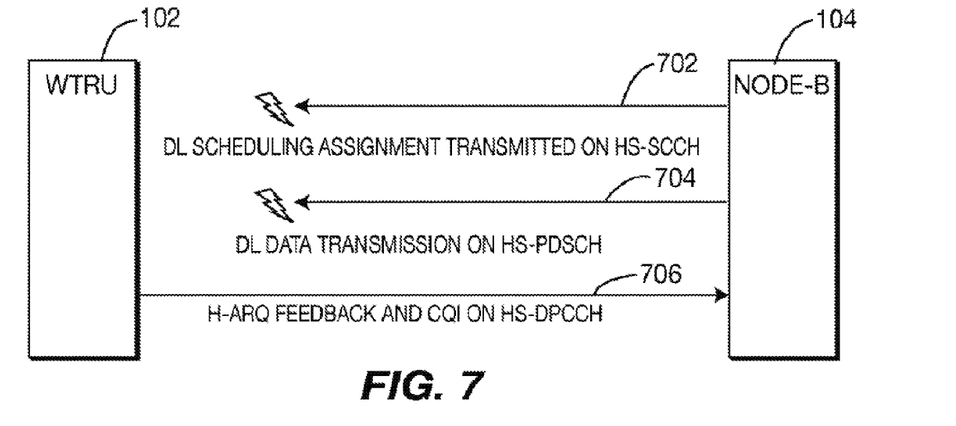
FIG. 7 is a scheme for recognizing an RL failure at the WTRU utilizing the HSDPA channels of FIG. 6.

In accordance with the present invention, the WTRU 102 utilizes criteria for recognizing an RL failure based on reception on the HS-SCCH 602 and the HS-PDSCH 604. FIG. 7 illustrates a scheme for recognizing an RL failure at the WTRU 102 utilizing HSDPA in accordance with the present invention. The scheduler 308 of the Node-B 104 sends DL scheduling assignment 702, (which is shown as a failed transmission in FIG. 7), to the WTRU 102 via the HS-SCCH 602

The measurement unit 206 of the WTRU 102, as shown in FIG. 2, may also measure channel quality on the HS-SCCH 602. If the channel quality of the HS-SCCH 602 remains below a predetermined threshold over a predetermined period of time, the WTRU 102 declares an RL failure. Use of this criteria is based on WTRU knowledge of HS-SCCH activity.

Referring to FIG. 7, if the WTRU 102 successfully receives the DL scheduling assignment 702 on the HS-SCCH 602, the WTRU 102 attempts to receive data transmission 704, (which is shown as a failed transmission in FIG. 7), via the HS-PDSCH 604 in accordance with the received DL scheduling assignment 702. The measurement unit 206 of the WTRU 102 monitors channel quality of the HS-PDSCH 604 and, if the channel quality of the HS-PDSCH 604 remains below a predetermined threshold over a predetermined period of time, the WTRU 102 may declare an RL failure and invoke a procedure for recovering the RL. The channel quality of the HS-SCCH 602 and the HS-PDSCH 604 may be evaluated based on SIR, $E_b/N_o$, BLER or any other relevant criteria. If the WTRU 102 successfully receives the data transmission 704, the WTRU 102 sends an H-ARQ feedback 706 including an ACK on the HS-DPCCH 606.

The controller 204 of the WTRU 102, as shown in FIG. 2, may further monitor an ACK/NACK ratio from CRC on the HS-PDSCH transmissions. If the ACK/NACK ratio is below a specified threshold, the WTRU 102 may declare an RL failure. The measurement unit 206 and the controller 204 of the WTRU 102 may further generate and send a CQI, preferably based on common pilot channel (CPICH) reception. If the measured channel quality is below a configured threshold (preferably over a specified time period), the WTRU 102 may declare an RL failure.

Criteria for the RL failure detection in the WTRU 102 should be specified for UTRAN configuration changes that result in disabling HSDPA reception in the WTRU 102. When SRBs are utilizing HSDPA, UTRAN controlled configuration changes which result in disabling HSDPA operation in the WTRU 102 are used as an additional RL failure detection criteria.

Figure 8:
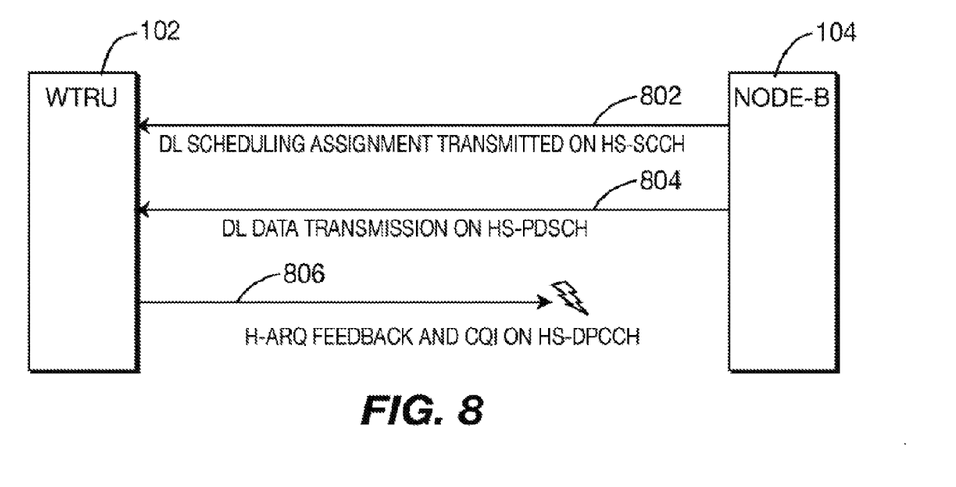
FIG. 8 is a scheme for recognizing an RL failure at the Node-B utilizing the HSDPA channels of FIG. 6.

In accordance with the present invention, the Node-B 104 utilizes criteria for recognizing an RL failure based on reception on the HS-DPCCH 606. FIG. 8 illustrates a scheme for recognizing an RL failure at the Node-B 104 utilizing HSDPA in accordance with the present invention. The WTRU 102 sends an H-ARQ feedback 806, (which is shown as a failed transmission in FIG. 8), after receiving a channel allocation 802 and data transmission 804 from the Node-B 104. The WTRU 102 may additionally be configured for periodic CQI reporting to Node-B 104. Node-B knowledge of the H-ARQ feedback and CQI reporting, by specified signaling procedures, allows Node-B detection of HS-DPCCH failures. The measurement unit 306 of the Node-B 104, as shown in FIG. 3, may also monitor channel quality of the HS-DPCCH 606, and if the channel quality of the HS-DPCCH 606 remains below a predetermined threshold over a specified time period, the controller 304 of the Node-B 104 declares an RL failure. The quality of the HS-DPCCH 606 may be evaluated based on SIR, $E_b/N_o$, BLER or any other relevant criteria.

The controller 304 of the Node-B 104 may further use the reported CQI or an ACK/NACK ratio as criteria for the RL failure detection. If an average of the reported CQI or an ACK/NACK ratio over a sliding window period is below a threshold, or if an average of the number of discarded MAC-hs transmissions is above a threshold, the controller 304 of the Node-B 104 may declare an RL failure.

The RL failure may be determined by an RNC. In this case, the Node-B 104 reports necessary information to the RNC such as HS-DPCCH quality statistics, reported CQI, H-ARQ ACK/NACK indications, or MAC-hs transmission failure indications.

Although the features and elements of the present invention are described in the preferred embodiments in particular combinations, each feature or element can be used alone without the other features and elements of the preferred embodiments or in various combinations with or without other features and elements of the present invention.

What is claimed is:

1. One or more non-transitory computer-readable media having instructions that, when executed, cause a user equipment (UE) to:
    monitor a high speed downlink packet access (HSDPA) channel, wherein the HSDPA channel includes at least one of a high speed shared control channel (HS-SCCH), a high speed physical downlink shared channel (HS-PDSCH), or a high speed dedicated physical control channel (HS-DPCCH);
    determine a channel quality of the HSDPA channel, wherein the channel quality is determined based at least in part on a ratio of energy per chip to power density;
    declare a radio link failure if the determined channel quality of the HSDPA channel remains below a predetermined threshold over a predetermined period of time; and
    invoke a procedure to recover the radio link.

2. The one or more non-transitory computer-readable media of claim 1, wherein at least one processor is to execute instructions to further determine the channel quality based at least in part on a signal-to-interference ratio (SIR) or a block error ratio (BLER).

3. The one or more non-transitory computer-readable media of claim 1, wherein at least one processor is to execute instructions to control transmission of hybrid automatic repeat request (H-ARQ) feedback on the HS-DPCCH in response to receiving a successful transmission on the HS-SCCH or the HS-PDSCH.

4. The one or more non-transitory computer-readable media of claim 1, wherein declaration of the radio link failure may also be based on whether a ratio of an acknowledgement (ACK) to negative acknowledgment (NACK) falls below a predetermined threshold.

5. The one or more non-transitory computer-readable media of claim 1, wherein at least one processor is to execute instructions to further determine the channel quality based at least in part on a common pilot channel (CPICH) reception.

6. The one or more non-transitory computer-readable media of claim 1, wherein at least one processor is to execute instructions to control transmission of a channel quality indicator (CQI) in response to the determined channel quality.

7. An apparatus to be employed by a user equipment (UE), the apparatus comprising:
    one or more processors coupled with at least one memory, wherein at least one processor of the one or more processors is to execute instructions to:
        monitor a high speed downlink packet access (HSDPA) channel, wherein the HSDPA channel includes at least one of a high speed shared control channel (HS-SCCH), a high speed physical downlink shared channel (HS-PDSCH), or a high speed dedicated physical control channel (HS-DPCCH), determine a channel quality of the HSDPA channel, wherein the channel quality is determined based at least in part on a ratio of energy per chip to power density, declare a radio link failure if the determined channel quality of the HSDPA channel remains below a predetermined threshold over a predetermined period of time, and invoke a procedure to recover the radio link.

8. The apparatus of claim 7, wherein the at least one processor is to execute instructions to further determine the channel quality based at least in part on a signal-to-interference ratio (SIR) or a block error ratio (BLER).

9. The apparatus of claim 7, wherein the at least one processor is to execute instructions to control transmission of hybrid automatic repeat request (H-ARQ) feedback on the HS-DPCCH in response to receiving a successful transmission on the HS-SCCH or the HS-PDSCH.

10. The apparatus of claim 7, wherein declaration of the radio link failure may also be based on whether a ratio of an acknowledgement (ACK) to negative acknowledgment (NACK) falls below a predetermined threshold.

11. The apparatus of claim 7, wherein the at least one processor is to execute instructions to further determine the channel quality based at least in part on a common pilot channel (CPICH) reception.

12. The apparatus of claim 7, wherein the at least one processor of the one or more processors is to execute instructions to control transmission of a channel quality indicator (CQI) in response to the determined channel quality.

13. One or more non-transitory computer-readable media having instructions that, when executed, cause a user equipment (UE) to:

monitor a set of high speed shared control channels (HS-SCCHs);

determine a channel quality of each HS-SCCH of the set of HS-SCCHs, wherein the channel quality is determined based at least in part on a ratio of energy per chip to power density;

declare a radio link failure if the determined channel quality of an HS-SCCH of the set of HS-SCCHs remains below a predetermined threshold over a predetermined period of time; and invoke a procedure to recover the radio link.

14. The one or more non-transitory computer-readable media of claim 13, wherein at least one processor is to execute instructions to further determine the channel quality based at least in part on a signal-to-interference ratio (SIR) or a block error ratio (BLER).

15. The one or more non-transitory computer-readable media of claim 13, wherein at least one processor is to execute instructions to control transmission of hybrid automatic repeat request (H-ARQ) feedback on an HS-DPCCH in response to receiving a successful transmission on the HS-SCCH or an HS-PDSCH.

16. The one or more non-transitory computer-readable media of claim 13, wherein declaration of the radio link failure may also be based on whether a ratio of an acknowledgement (ACK) to negative acknowledgment (NACK) falls below a predetermined threshold.

17. The one or more non-transitory computer-readable media of claim 13, wherein at least one processor is to execute instructions to further determine the channel quality based at least in part on a common pilot channel (CPICH) reception.

18. The one or more non-transitory computer-readable media of claim 13, wherein at least one processor is to execute instructions to control transmission of a channel quality indicator (CQI) in response to the determined channel quality.

19. An apparatus to be employed by a user equipment (UE), the apparatus comprising:

one or more processors coupled with at least one memory, wherein at least one processor of the one or more processors is to execute instructions to:

monitor a set of high speed shared control channels (HS-SCCHs);

determine a channel quality of each HS-SCCH of the set of HS-SCCHs, wherein the channel quality is determined based at least in part on a ratio of energy per chip to power density;

declare a radio link failure if the determined channel quality of an HS-SCCH of the set of HS-SCCHs remains below a predetermined threshold over a predetermined period of time; and invoke a procedure to recover the radio link.

20. The apparatus of claim 19, wherein the at least one processor is to execute instructions to further determine the channel quality based at least in part on a signal-to-interference ratio (SIR) or a block error ratio (BLER).

21. The apparatus of claim 19, wherein the at least one processor is to execute instructions to control transmission of hybrid automatic repeat request (H-ARQ) feedback on an HS-DPCCH in response to receiving a successful transmission on the HS-SCCH or an HS-PDSCH.

22. The apparatus of claim 19, wherein declaration of the radio link failure may also be based on whether a ratio of an acknowledgement (ACK) to negative acknowledgment (NACK) falls below a predetermined threshold.

23. The apparatus of claim 19, wherein the at least one processor is to execute instructions to further determine the channel quality based at least in part on a common pilot channel (CPICH) reception.

24. The apparatus of claim 19, wherein the at least one processor of the one or more processors is to execute instructions to control transmission of a channel quality indicator (CQI) in response to the determined channel quality.

* * * * *